US009628985B2

(12) United States Patent
Sunell et al.

(10) Patent No.: US 9,628,985 B2
(45) Date of Patent: Apr. 18, 2017

(54) PROTOCOL VERSION INDICATION

(71) Applicant: Telefonaktiebolaget L M Ericsson (publ), Stockholm (SE)

(72) Inventors: Kai-Erik Sunell, Bromma (SE); Mikael Wittberg, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/650,465

(22) PCT Filed: Apr. 24, 2015

(86) PCT No.: PCT/SE2015/050462
§ 371 (c)(1),
(2) Date: Jun. 8, 2015

(87) PCT Pub. No.: WO2015/171047
PCT Pub. Date: Nov. 12, 2015

(65) Prior Publication Data
US 2016/0269894 A1 Sep. 15, 2016

Related U.S. Application Data

(60) Provisional application No. 61/989,255, filed on May 6, 2014.

(51) Int. Cl.
*H04W 8/24* (2009.01)
*H04W 76/02* (2009.01)
(Continued)

(52) U.S. Cl.
CPC ............ *H04W 8/24* (2013.01); *H04W 48/08* (2013.01); *H04W 76/023* (2013.01); *H04W 16/14* (2013.01); *H04W 84/042* (2013.01)

(58) Field of Classification Search
None
See application file for complete search history.

(56) References Cited

U.S. PATENT DOCUMENTS

2004/0009770 A1* 1/2004 Sivanandan .......... H04W 28/18
455/425
2006/0282545 A1* 12/2006 Arwe ...................... H04L 69/24
709/237
(Continued)

FOREIGN PATENT DOCUMENTS

| EP | 2645781 A2 | 10/2013 |
| WO | 2013095382 A1 | 6/2013 |
| WO | 2013109370 A2 | 7/2013 |

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)", 3 GPP TS 36.321 V12.1.0, Mar. 2014, 1-57.
(Continued)

*Primary Examiner* — Andrew Lai
*Assistant Examiner* — Jamaal Henson
(74) *Attorney, Agent, or Firm* — Murphy, Bilak & Homiller, PLLC

(57) ABSTRACT

Mobile devices exchange indications of their supported access stratum (AS) versions with each other during device-to-device communication, to determine a common AS version for subsequent communication. In an example method, a first wireless device receives a first incoming version indicator from a second wireless device, the first incoming version indicator identifying an AS version supported by the second wireless device, and transmits a device version indicator in one or more outgoing messages, in response to determining that the first incoming version indicator is unknown to the first wireless device or that the first incom-
(Continued)

ing version indicator corresponds to an AS version that is not supported by the first wireless device. The transmitted device version indicator corresponds to the most recent AS version of two or more AS versions supported by the first wireless device.

17 Claims, 4 Drawing Sheets

(51) Int. Cl.
*H04W 48/08* (2009.01)
*H04W 16/14* (2009.01)
*H04W 84/04* (2009.01)

(56) References Cited

U.S. PATENT DOCUMENTS

| | | |
|---|---|---|
| 2008/0253391 A1 | 10/2008 | Krits et al. |
| 2009/0198821 A1 | 8/2009 | Lin |
| 2009/0215446 A1* | 8/2009 | Hapsari .............. H04W 48/18 455/432.1 |
| 2011/0082940 A1* | 4/2011 | Montemurro .......... H04L 69/24 709/227 |
| 2013/0288668 A1 | 10/2013 | Pragada et al. |
| 2014/0187224 A1 | 7/2014 | Liu et al. |

OTHER PUBLICATIONS

Unknown, Author, "Configuration of ProSe UEs", Ericsson, 3GPP TSG-RAN WG2 #86, Tdoc R2-142391, Seoul, South Korea, May 19-23, 2014, 1-5.
Unknown, Author, "Release handling in ProSe", Ericsson, 3GPP TSG-RAN WG2 #87, Tdoc R2-143429, Dresden, Germany, Aug. 18-22, 2014, 1-2.
3GPP, "3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.5.0, Mar. 2014, 1-56.
3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, Mar. 2014, 1-347.
3GPP, "3rd Generation Partnership Project; Technical Specification Group Services and System Aspects; Feasibility study for Proximity Services (ProSe) (Release 12)", 3GPP TR 22.803 V12.2.0, Jun. 2013, 1-45.
3GPP, "3rd Generation Partnership Project; Technical Specification Group Services and System Aspects; Study on architecture enhancements to support Proximity-based Services (ProSe) (Release 12)", 3GPP TR 23.703 V1.1.0, Jan. 2014, 1-341.
Unknown, Author, "Work item proposal on LTE Device to Device Proximity Services", Qualcomm Incorporated, 3GPP TSG RAN Meeting #63, RP-140518, Fukuoka, Japan, Mar. 3-6, 2014, 1-7.

* cited by examiner

TABLE 6.2.1-2 VALUES OF LCID FOR UL-SCH

| INDEX | LCID VALUES |
|---|---|
| 00000 | CCCH |
| 00001-01010 | IDENTITY OF THE LOGICAL CHANNEL |
| 01011 | REL-12 |
| 01100 | REL-13 |
| 01101-11000 | RESERVED |
| ~~01011-11000~~ | ~~RESERVED~~ |
| 11001 | EXTENDED POWER HEADROOM REPORT |
| 11010 | POWER HEADROOM REPORT |
| 11011 | C-RNTI |
| 11100 | TRUNCATED BSR |
| 11101 | SHORT BSR |
| 11110 | LONG BSR |
| 11111 | PADDING |

*FIG. 3*

PROTOCOL VERSION INDICATION

TECHNICAL FIELD

The technology disclosed herein relates generally to wireless communication networks, and more particularly relates to wireless device-to-device communications.

BACKGROUND

Device-to-device (D2D) communication is a well-known and widely used component of many existing wireless technologies, including ad hoc and cellular networks. Examples include Bluetooth and several variants of the IEEE 802.11 standards suite, such as WiFi Direct. These example systems operate in unlicensed spectrum.

Although the idea of enabling D2D communications as a means of relaying in cellular networks was proposed by some early works on ad hoc networks, the concept of allowing local D2D communications to (re)use cellular spectrum resources simultaneously with ongoing cellular traffic is relatively new. Because non-orthogonal resource sharing between the cellular and the D2D layers has the potential of reuse gain and proximity gain, along with increased resource utilization, the concept of D2D communications underlying cellular networks has received considerable interest in recent years.

The Third Generation Partnership Project (3GPP) refers to Network Controlled D2D as "Proximity Services" or "ProSe," and efforts aimed at integrated D2D functionality into the Long Term Evolution (LTE) specifications are underway. The ProSe Study Item (SI) recommends supporting D2D operation between wireless devices—referred to as user equipments or UEs by 3GPP—that are outside of network coverage, as well as operation between in-coverage and out-of-coverage wireless devices.

Specifically, in 3GPP LTE networks, such LTE Direct (D2D) communication can be used in commercial applications, such as cellular network offloading, proximity-based social networking. D2D communications involving out-of-coverage operation are expected to be particularly important in so-called national security and public safety services (NSPS), such as in public safety situations in which first responders need to communicate with each other and with people in a disaster area. In some of these applications, it may be the case that communication is largely or entirely in one direction, i.e., one-to-many communications, where one device is sending and multiple devices are listening. However, both commercial and public safety applications are among the use cases discussed in the feasibility study performed by members of the 3rd-Generation Partnership Project (3GPP) and documented in the report "3rd Generation Partnership Project; Technical Specification Group Services and System Aspects; Feasibility study for Proximity Services (ProSE)," 3GPP TR 22.803, v. 12.2.0 (June 2013), available at www.3gpp.org.

D2D communication entities using an LTE Direct link may reuse the same physical resource blocks (PRBs), the basic time-frequency resource in the LTE radio link) as used for cellular communications either in the downlink or in the uplink or both. The reuse of radio resources in a controlled fashion can lead to the increase of spectral efficiency at the expense of some increase of the intra-cell interference.

Typically, D2D communicating entities in an LTE-underlying scenario will use uplink (UL) resources, such as UL PRBs or UL time slots, but conceptually it is possible that D2D (LTE Direct) communications take place in the cellular downlink (DL) spectrum or in DL time slots. For ease of presentation, in the present disclosure it is assumed that D2D links use uplink resources, such as uplink PRBs in a Frequency-Division Duplexing (FDD) LTE system, or uplink time slots in an a cellular Time-Division Duplexing (TDD) system, but the ideas disclosed herein may be readily applied to cases in which D2D communications take place in DL spectrum as well.

An important aspect of D2D communications is the concept of "discovery," which deals with the techniques and procedures used by a D2D device to detect the proximity of other devices that are capable of and authorized to engage in D2D communications.

The 3GPP technical report titled "Study on architecture enhancements to support Proximity-based Services (ProSe)," briefly outlines several approaches to discovery, including an "LTE based solution for direct discovery." (3GPP TR 23.703, sec. 6.1 v 1.1.0 (January 2014).) According to this approach, an "announcing UE," i.e., a wireless device that wishes to make its services or need for services known to other devices receives a so-called expression code from a ProSe function in or attached to the LTE network, e.g., in a ProSe server, and broadcasts the received expression code. Other wireless devices, referred to in 3GPP documentation as "monitoring UEs" monitor for broadcasts from announcing UEs and compare any received expression code to one or more expression codes that they may have previously received, to detect the presence of announcing UEs they are interested in communicating with.

In general, an important requirement for any widely used communication protocol is that it can evolve and extend in a backward compatible manner. For this reason, 3GPP radio interface protocol stacks are based on the concept of access stratum (AS) release. The main principle behind the AS release concept is that new functions, features and corrections to the AS specifications are grouped together and introduced in a new release, i.e., a new version, of the protocol stack. In operation, a mobile device indicates its AS version to the network side of the radio interface, e.g., by sending an indicator that indicates whether the mobile device supports Release 8, 9, 10, etc., of the 3GPP specifications applicable to the mobile device. AS version is indicated by using dedicated Radio Resource Control (RRC) protocol signaling. The network side is responsible for configuration and control of the mobile device, and network nodes are able to handle different versions of the protocols. Therefore, network nodes do not have AS release indicators and they do not need to indicate anything about their implemented versions back to the mobile device.

SUMMARY

Several embodiments of the techniques disclosed herein provide for mobile devices that exchange their AS versions with each other during device-to-device communication. Thus, a mobile device receives AS version information for one or more other mobile devices, as well as transmitting AS version information to other devices. This approach is different from that used by current 3GPP protocol stacks, where only the mobile device indicates its AS version to the network.

The exchanged AS versions may be used by the mobile devices to fall back, as necessary, to an AS version that is supported by all mobile devices within a communicating group. The mobile devices may thus autonomously adapt to the exchanged AS versions independently of each other and without any help from fixed network nodes. An advantage to this approach is that the protocol stack for device-to-device communication can be versioned, and therefore can be evolved, maintained, and deployed in a backwards-compatible manner.

Embodiments of the presently disclosed techniques include several methods suitable for implementation in a wireless device configured for operation in a wireless communication network and further configured for device-to-device communication with one or more other wireless devices. According to some of these embodiments, the method includes a first wireless device receiving a first incoming version indicator from a second wireless device, the first incoming version indicator identifying an access stratum version supported by the second wireless device, and transmitting a device version indicator in one or more outgoing messages, in response to determining that the first incoming version indicator is unknown to the first wireless device or that the first incoming version indicator corresponds to an access stratum version that is not supported by the first wireless device. The transmitted device version indicator corresponds to the most recent access stratum version of two or more access stratum versions supported by the first wireless device.

In some embodiments, the first incoming version indicator is received and the device version indicator is transmitted in Medium Access Control (MAC) layer messages. In others, the first incoming version indicator and the device version indicator are signaled using logical channel identifier (LCID) index values in MAC control elements. In still others, the first incoming version indicator and device version indicator are signaled using values carried by special MAC control elements, each of the special MAC control elements carrying a predetermined logical channel identifier (LCID) index value that identifies the special MAC control element as carrying an access stratum version indicator. In yet other embodiments, the first incoming version indicator and device version indicator are signaled using values carried in a predetermined field of MAC layer messages having a format specific to device-to-device communication, each of the MAC layer messages carrying a bit indicating that the MAC layer has the format specific to device-to-device communication.

In some instances of the methods described above, the device version indicator is transmitted in response to receiving an incoming version indicator that corresponds to a more recent access stratum version than the most recent access stratum version supported by the first wireless device. In other instances, the device version indicator is transmitted in response to receiving an incoming version indicator that corresponds to an earlier access stratum version than the earliest access stratum version supported by the first wireless device. In others, the device version indicator is transmitted in response to receiving an incoming version indicator that is unknown to the first wireless device.

In the above-summarized methods, the first wireless device transmits a device version indicator in one or more outgoing messages in response to determining that the first incoming version indicator is unknown to the first wireless device or that the first incoming version indicator corresponds to an access stratum version that is not supported by the first wireless device. Of course, the wireless device may also receive incoming version indicators that correspond to an access stratum version that is supported by the wireless device. In some cases, that access stratum version may be less recent than the access stratum version currently used by the first wireless device. Accordingly, some embodiments and/or instances of the methods summarized above may further comprise receiving a second incoming version indicator, and subsequently using an access stratum version corresponding to the second incoming version indicator, in response to determining that the second incoming version indicator corresponds to an access stratum version that is supported by the first wireless device and that is less recent than an access stratum version currently used by the first wireless device. In some cases, subsequently using the access stratum version may comprise transmitting one or more messages that are formatted according to the access stratum version corresponding to the second incoming version indicator or that include an outgoing version indicator corresponding to the second incoming version indicator, or both.

Other embodiments of the disclosed techniques include computer program products, processing circuits and/or wireless device apparatus configured to carry out one or more of the methods summarized above.

In the detailed description that follows, several embodiments are described in detail. Following the detailed description is a listing of example embodiments of the techniques and apparatus disclosed herein. It should be appreciated however, that this listing of example embodiments is intended to be illustrative, and not exhaustive.

BRIEF DESCRIPTION OF THE FIGURES

FIG. 3 shows an example allocation of medium access control (MAC) header values for access stratum indication.

DETAILED DESCRIPTION

Figure 1:
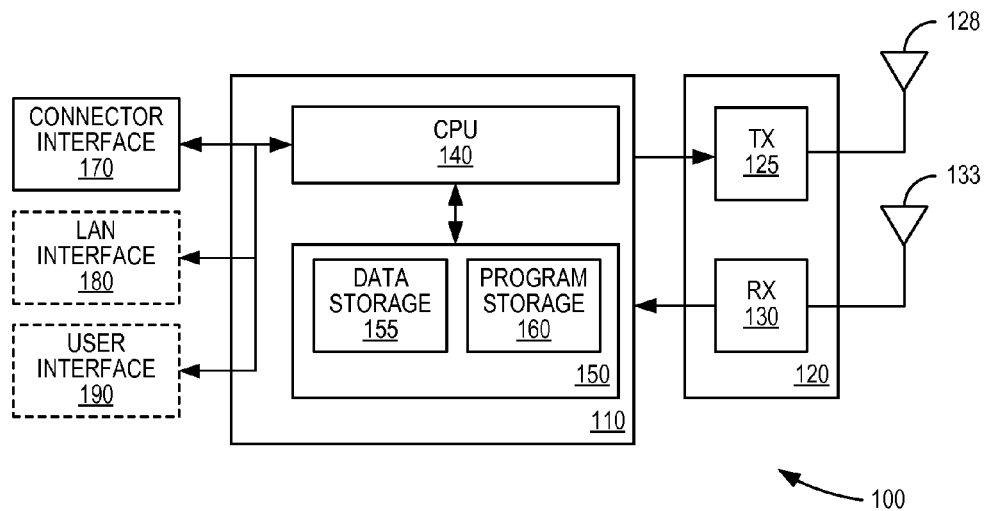
FIG. 1 is a block diagram illustrating components of an example wireless device.

Inventive concepts will now be described more fully hereinafter with reference to the accompanying drawings, in which examples of embodiments of inventive concepts are shown. These inventive concepts may, however, be embodied in many different forms and should not be construed as limited to the embodiments set forth herein. Rather, these embodiments are provided so that this disclosure will be thorough and complete, and fully convey the scope of present inventive concepts to those skilled in the art. It should also be noted that these embodiments are not mutually exclusive. Components from one embodiment may be tacitly assumed to be present or used in another embodiment.

For purposes of illustration and explanation only, some embodiments of the present inventive concepts are described herein in the context of operating in or in association with a Radio Access Network (RAN) that communicates over radio communication channels with mobile terminals (also referred to as wireless terminals or UEs).

In some embodiments of a RAN, several base stations may be connected (e.g., by landlines or radio channels) to a radio network controller (RNC). A radio network controller, also sometimes termed a base station controller (BSC), may supervise and coordinate various activities of the plural base stations connected thereto. A radio network controller may be connected to one or more core networks. According to some other embodiments of a RAN, base stations may be connected to one or more core networks without a separate RNC(s) between, for example, with functionality of an RNC implemented at base stations and/or core networks.

As used herein, the terms "mobile terminal," "wireless terminal," "user equipment," "wireless device," "mobile device," or "UE" may be used to refer to any device that receives data from and transmits data to a communication network, any of which may be for example, a mobile telephone ("cellular" telephone), laptop/portable computer, pocket computer, hand-held computer, desktop computer, a machine-to-machine (M2M) or machine-type-communications (MTC) type device, a sensor with a wireless communication interface, etc. Devices of any of these types may be adapted, according to known techniques and according to the additional techniques disclosed herein, for operation in a device-to-device (D2D) mode, where such operation may include the transmitting and receiving of certain signals that are similar to or identical with corresponding signals used when operating within a cellular network, i.e., in a device-to-base-station operating mode.

Note that although terminology from specifications for the Long-Term Evolution (LTE; also referred to as the Evolved Universal Terrestrial Radio Access Network, or E-UTRAN) and/or the Universal Mobile Telecommunications System (UMTS) is used in this disclosure to exemplify embodiments of the inventive concepts, this should not be seen as limiting the scope of the presently disclosed techniques to only these systems. Devices designed for use in other wireless systems, including variations and successors of 3GPP LTE and WCDMA systems, WiMAX (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Several of the techniques and methods described herein are implemented using radio circuitry, electronic data processing circuitry, and other electronic hardware provided in a mobile terminal. FIG. 1 illustrates features of an example mobile terminal 100 according to several embodiments of the present invention. Mobile terminal 100, which may be a UE configured for operation with an LTE wireless communication network (E-UTRAN), for example, as well as for operation in a device-to-device mode, comprises a radio transceiver circuit 120 configured to communicate with one or more base stations and/or one or more other mobile terminals, as well as a processing circuit 110 configured to process the signals transmitted and received by the transceiver unit 120. Transceiver circuit 120 includes a transmitter 125 coupled to one or more transmit antennas 128 and receiver 130 coupled to one or more receiver antennas 133. The same antenna(s) 128 and 133 may be used for both transmission and reception.

Receiver 130 and transmitter 125 use known radio processing and signal processing components and techniques, typically according to a particular telecommunications standard such as the 3GPP standards for LTE. Note also that transmitter circuit 120 may comprise separate radio and/or baseband circuitry for each of two or more different types of radio access network, in some embodiments. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the invention, additional details are not shown here.

Processing circuit 110 comprises one or more processors 140 coupled to one or more memory devices 150 that make up a data storage memory 155 and a program storage memory 160. Processor 140, identified as CPU 140 in FIG. 1, may be a microprocessor, microcontroller, or digital signal processor, in some embodiments. More generally, processing circuit 110 may comprise a processor/firmware combination, or specialized digital hardware, or a combination thereof. Memory 150 may comprise one or several types of memory such as read-only memory (ROM), random-access memory, cache memory, flash memory devices, optical storage devices, etc. Because terminal 100 may support multiple radio access networks, including, for example, a wide-area RAN such as LTE as well as a wireless local-area network (WLAN), processing circuit 110 may include separate processing resources dedicated to one or several radio access technologies, in some embodiments. Again, because the various details and engineering tradeoffs associated with the design of baseband processing circuitry for mobile devices are well known and are unnecessary to a full understanding of the invention, additional details are not shown here.

Typical functions of the processing circuit 110 include modulation and coding of transmitted signals and the demodulation and decoding of received signals. In several embodiments of the present invention, processing circuit 110 is adapted, using suitable program code stored in program storage memory 160, for example, to carry out one of the techniques specifically described herein, including, for example, the method illustrated in FIG. 4 and variants thereof. Of course, it will be appreciated that not all of the steps of these techniques are necessarily performed in a single microprocessor or even in a single module.

Mobile terminal 100 may further include one or more additional interface circuits, depending on the specific application for the unit. Typically, mobile terminal 170 includes connector interface circuitry 170. In some embodiments, connector interface circuitry 170 may consist of no more than terminals and associated hardware to support charging of an on-board battery (not shown) or to provide direct-current (DC) power to the illustrated circuits. More often, connector interface circuitry 170 further includes a wired communication and/or control interface, which may operate according to proprietary signaling and message formats in some embodiments, or according to a standardized interface definition, in others. For example, connector interface 170 may comprise terminals and associated hardware for support of the well-known Universal Serial Bus (USB) interface. It will be appreciated that while connector interface circuitry 170 includes at least the necessary receiver and driver circuits to support such an interface and may further comprise specialized hardware/firmware, part of the interface functionality may be provided by CPU 140, configured with appropriate firmware and/or software in memory 150, in some embodiments.

Mobile terminal 100 may further comprise local-area network (LAN) interface circuitry 180, in some embodiments. In some embodiments, for example, LAN interface circuitry 180 may provide support for wireless LAN (WLAN) functionality, such as according to the well-known Wi-Fi standards. In some such embodiments, LAN interface circuitry 180 may include an appropriate antenna or antennas. In other embodiments, LAN interface circuitry 180 may make use of one or more common antenna structures that provide reception and/or transmission of WLAN signals as well as wide-area RAN signals. In some embodiments, LAN interface circuitry 180 may be relatively self-contained, in that it includes all of the necessary hardware, firmware, and/or software to carry out the LAN functionality, including the associated protocol stacks. In other embodiments, at least parts of the LAN functionality may be carried out by processing circuit 110.

Still further, mobile terminal 100 may include user-interface circuitry 190, which may include, for example, circuitry and/or associated hardware for one or more switches, pushbuttons, keypads, touch screens, and the like, for user input, as well as one or more speakers and/or displays for output. Of course, some mobile terminals, such as those developed for machine-to-machine applications or for insertion into another device (e.g., a laptop computer) may have only a subset of these input/output devices, or none at all.

As discussed above, 3GPP is developing specifications for proximity services, often referred to as "ProSe," which include specifications for device-to-device (D2D) operation utilizing the same time-frequency resources used by LTE networks, in each of several possible operating modes that include in-coverage operation (where the involved D2D devices are all within the coverage area of an LTE network), out-of-coverage operation (where none of the devices are within the coverage area of an LTE network), and combinations of both. As noted above, D2D communications involving out-of-coverage operation are expected to be particularly important in so-called national security and public safety services (NSPS), such as in public safety situations in which first responders need to communicate with each other and with people in a disaster area.

Figure 2:
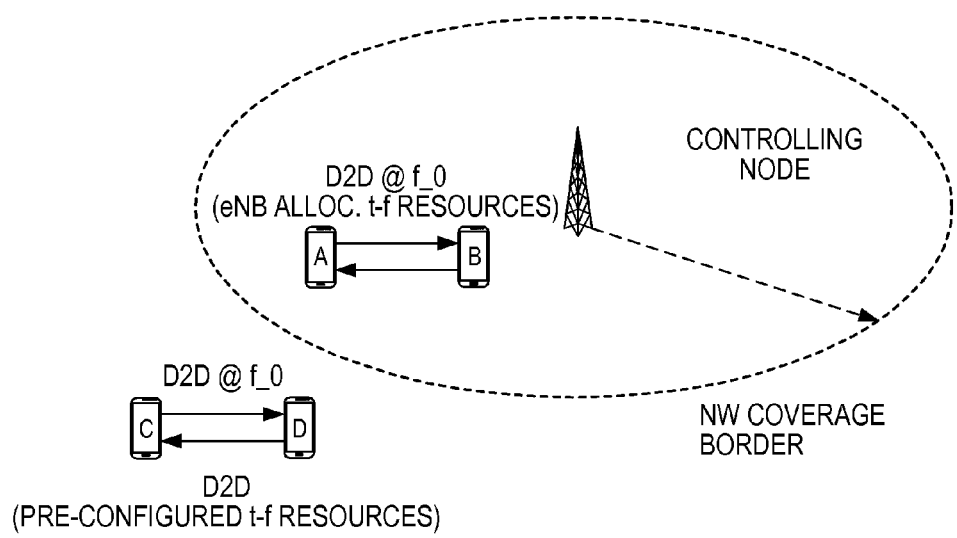
FIG. 2 illustrates in-coverage and out-of-coverage scenarios for device-to-device communications.

FIG. 2 illustrate basic principles for D2D communication within LTE, for both in-coverage and out-of-coverage scenarios. A controlling node, e.g., an eNode B or a Cluster Head, controls the communication on a frequency carrier f_0. In a first scenario, devices A and B are communicating directly via a D2D link, and both devices are inside network (NW) coverage of the controlling node. The controlling node then allocates the radio resources to devices A and B for use in D2D communication. In the second scenario, devices C and D may have D2D communication out of reach from a controlling node, i.e. out of coverage. In this case the D2D communication devices are using pre-configured time-frequency resources for D2D communication. The pre-configuration of these resources may be by standard, for example. In some cases, the pre-configuration of these resources may depend on the device's capabilities. For example, one device might be categorized as an NSPS type-1 device, for police use, while another is categorized as an NSPS type-2 device, for military use. The pre-configuration of these different devices may then differ, depending on their respective capabilities.

As discussed above, procedures for direct discovery are being developed, whereby some wireless devices, referred to as "announcing devices" or "announcing UEs," are configured to transmit announcement messages indicating their desire to communicate with other D2D devices. Other wireless devices, referred to as "monitoring devices," "monitoring UEs," "discovering devices," "discovering UEs," or the like, are configured to monitor the appropriate radio resources to listen for transmitted announcement messages. The announcements may be application specific, and thus some devices may be both announcing devices and monitoring devices at the same time, e.g., for different applications.

As noted above, 3GPP radio interface protocol stacks are based on the concept of access stratum (AS) release. For conventional cellular communications, the mobile device indicates its AS version to the network side of the radio interface. The network side can handle different versions of the protocols, and does not need to indicate anything about their implemented versions back to the mobile device.

The existing solutions for AS version handling thus assume that the mobile device has a Radio Resource Control (RRC) connection to a wireless network, with dedicated signaling, and that all communication takes place through the fixed network infrastructure. In other words, it is assumed that there is a controlling node at the network side of the radio interface, and that this controlling node can handle mobile devices having any AS version. A problem arises in device-to-device communications scenarios, however, since proximity services will be provided in both partial-coverage and outside network coverage scenarios, where an RRC connection with the network cannot be maintained. Consequently, existing version handling solutions cannot be used for the envisioned device-to-device communication scenarios.

To address this problem, several embodiments of the techniques disclosed herein provide for mobile devices that exchange their AS versions with each other during device-to-device communication. Thus, mobile devices receive AS version information for one or more other mobile devices, as well as transmitting AS version information to other devices. This approach is different from that used by current 3GPP protocol stacks, where only the mobile device indicates its AS version to the network.

The exchanged AS versions are used by the mobile devices to fall back, as necessary, to an AS version that is supported by all mobile devices within a communicating group. The mobile devices thus autonomously adapt to the exchanged AS versions independently of each other and without any help from fixed network nodes. An advantage to this approach is that the protocol stack for device-to-device communication can be versioned, and therefore can be evolved, maintained, and deployed in a backwards compatible manner.

One issue that arises is how to communicate the AS version information from one mobile device to another. Because there is no RRC connection between the mobile devices, the AS version can instead be signaled using Medium Access Control (MAC) control elements. The LTE MAC protocol, as specified in 3GPP TS 36.321, v. 11.5.0 (March 2014), has unused control elements that are marked as reserved values.

FIG. 3 illustrates an example of how reserved values in MAC headers can be used for indication of Rel-12 and Rel-13 AS version in the UL direction. The figure illustrates a modified version of Table 6.2.1-2 from 3GPP TS 36.321, which sets out the values of the Logical Channel Identifier (LCID), which identifies the logical channel instance of the corresponding MAC System Data Unit (SDU) or the type of the corresponding MAC control element in LTE MAC messages. As seen in the figure, two of the reserved values for the LCID can be re-purposed to signal that the mobile device supports device-to-device communications according to Release 12 or Release 13 of the LTE specifications. Thus, upon the sending of a MAC header, a mobile device sets the corresponding LCID value for the AS release version. Correspondingly, at reception of the MAC header, a mobile device reads the LCID value and interprets it as the corresponding AS version.

Since the device-to-device communication is done between a device that is sending a message and devices that are receiving the same message, the specification of the message must be independent of whether the device is sending the message or receiving the message. This means that when extending the MAC protocol normally used for mobile-to-network communication to use reserved LCID values for device-to-device communication, the same LCID value must be allocated from the sets of values used in both the uplink (Table 6.2.1-2) and in downlink (Table 6.2.1-1), as defined in 3GPP TS 36.321.

As an alternative to reserving multiple values of the LCID to identify different AS versions, a single reserved LCID value can be used both in the UL and in the DL direction to indicate a special MAC Control Element (CE). The AS version indicator is then included in the MAC CE as a value.

In still another alternative solution, one of the two reserved bits ("R bits") in the MAC control sub-header may be used to indicate a special MAC format that is used for D2D communication. The AS version information may then be indicating using a specific value carried in a predetermined field in this special MAC format. Of course, the details of the special MAC format may be specified in any of many different ways that are suitable for D2D communication. As a special case, it is possible to design this special D2D MAC format in such a way that the AS version is always included as a mandatory element; this means that whenever communication is done between D2D UEs the receiving UEs will always be informed about the AS version of the sender UE.

For purposes of the present discussion, the following definitions are used:

"Device AS version" is the most recent AS version that is supported by the mobile device, e.g., Rel-14.

"Earlier version," with respect to a given mobile device, is a version that is released before the device AS version. For example, Rel-13 is an earlier version if the device version is Rel-14.

"Later version," with respect to a given mobile device, is a version that is released after the device AS version. For example, Rel-15 is a later version if the device AS version is Rel-14.

The "earliest supported version" is the oldest version that needs to be supported, e.g., Rel-12. The value can be configurable by the network or stored in a SIM card.

The "current AS version" for a given mobile device is the version that is currently used by the mobile device, e.g. Rel-13. The current AS version can be earlier than the device AS version but not earlier than the earliest supported version and not later than the device AS version. The current AS version should be a common AS version supported by all members of the group. The current version should be the latest possible AS version that is supported by all members of the group.

The purpose of exchanging AS version information among the mobile devices in a group is to ensure fallback to a common supported AS version within the group. Therefore, each member of the group should send its AS version to other members of the group as soon as it joins the group. Individual members of the group adapt their AS versions independently of each other, based on a set of rules.

It should be possible to change the AS version to a later version if necessary. Therefore, a mechanism with a timer may be used, to trigger a broadcast of AS version by members of the group at regular time intervals, for example. This will allow the rest of the group to move to a later AS version when a mobile device with a very early AS version leaves the group. Otherwise a group would be stuck using the earliest possible AS version even when it is no longer necessary, which is undesirable.

The mechanism needs to handle some exceptional cases as well. There sometimes may be reasons to not support all early AS versions, and therefore at some point of time it may be reasonable to ignore a legacy device that is too old.

Each mobile device is controlled by a set of rules that are executed in a distributed manner, i.e., independently of the other members of the group. The main principle is that the mobile device will try to estimate the common AS version by receiving AS versions from other members of the group. The estimated value is used by the mobile device as its current AS version—the current AS version should generally be the latest possible AS version that is supported by all members of the group.

The rules define actions upon the reception of AS versions and handling of unforeseen events as well as conditions for sending the AS version to other members of the group. Example rules for a mobile device may be as follows:

Upon joining a group, set the current AS version value to the device AS version and broadcast the device AS version to other members of the group (and, optionally, start a timer).

Upon reception of unknown data, the mobile device broadcasts its device AS version to other members of the group.

Upon reception of an AS version that is earlier than the current AS version, the mobile device shall fallback to the received AS version. If the earlier version is earlier than the earliest supported version, the mobile device shall ignore the AS version.

Upon reception of an AS version that is later than the device AS version, the mobile device shall broadcast its device AS version to other members of the group.

If the timer expires, broadcast the device AS version to other members of the group and restart the timer.

Figure 4:
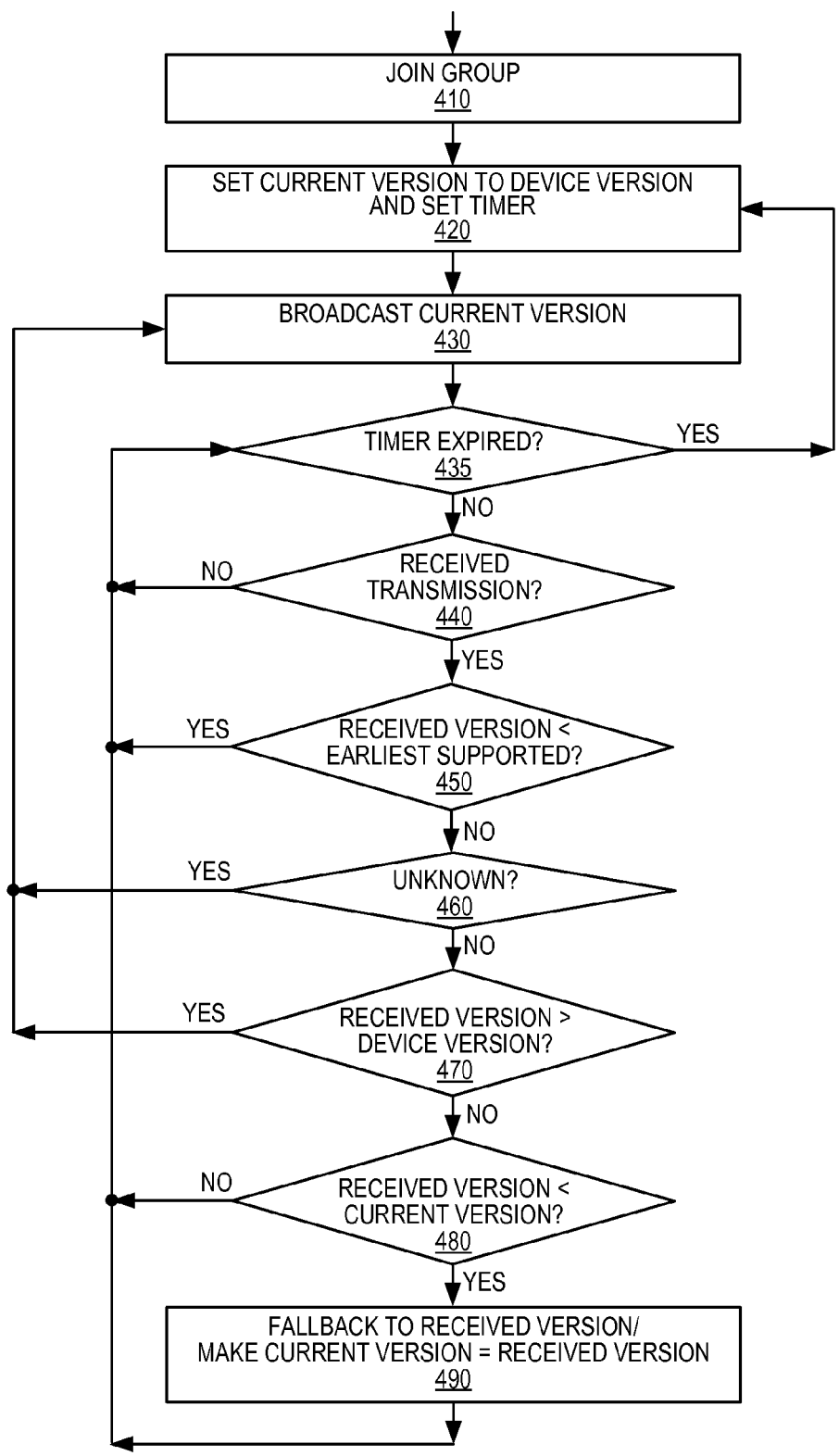
FIG. 4 is a process flow diagram illustrating an example method according to some of the presently disclosed techniques.

FIG. 4 is a process flow diagram illustrating an example implementation of the above rules, under the assumption that a timer is used to trigger a repeating of the process. As seen at block 410, the process begins with a decision to join a D2D group. This step should be understood broadly—the device may be joining an already existing group or attempting to start a new group by broadcasting its availability. As shown at block 420, the mobile device sets its current AS version to the device AS version, i.e., the highest (or most recent) AS version supported by the mobile device, and sets a timer.

After setting the timer, the mobile device broadcasts its current AS version, which at the outset is the device AS version. This is shown at block 430. After checking whether the timer has expired, as shown at block 435, the mobile device begins to listen for a transmission from another mobile device, as shown at block 440.

When a transmission is received, the mobile device checks whether the AS version (if any) signaled in the received transmission is lower than (i.e., older than) the earliest AS version supported by the mobile device. This is shown at block 450. If it is, the AS version can be ignored, and the mobile device resumes listening, after checking the timer. If the transmission is "unknown," in that it does not include an AS version or is otherwise unintelligible or incapable of being understood by the receiving mobile device, as shown at block 460, the mobile device responds by broadcasting its device version (at block 430), and then resumes listening.

If the received transmission does include an AS version but that AS version is higher than (i.e., more recent than) the most recent AS version supported by the mobile device, as shown at block 470, then the mobile device also responds by broadcasting its current version (at block 430), and then resumes listening (at block 440). Otherwise, the AS version included in the received transmission is either the same as the device's current AS version or is a lower version that is supported by the device, at least if no new mobile device having an AS version greater than the mobile device's current version (but not greater than the mobile device's device version) has attempted to join the group since the mobile device's last broadcast. If the received AS version is not lower than the mobile device's AS version, as shown at block 480, then no explicit action is required, and the mobile device checks the timer (block 435) and resumes listening (block 440). If the received AS version is lower than (i.e., earlier than) the mobile device's current AS version, then the mobile device falls back to the received AS version and makes it the current AS version, as shown at block 490, and then checks the timer (block 435) and resumes listening (block 440).

It will be appreciated that the process illustrated in FIG. 4 need not be carried out in the precise order indicated. Further variations of the process are possible, as well. For example, with the illustrated process, if a new mobile device attempts to join an established group using an AS version that is supported by the mobile device carrying out the process of FIG. 4 but that is greater than the current AS version, the mobile device simply ignores it. This is an acceptable approach because (a) the receiving mobile device supports the AS version corresponding to the received message and can thus properly interpret the message, and (b) the new mobile device should be "corrected," if necessary, by any other mobile device in the group that cannot support that AS version. However, other processes might provide for an immediate correction by any mobile device that receives an AS version that is higher (i.e., more recent) than the current AS version, even if it is supported by the receiving mobile device. Of course, still other variations that generally conform to the rules described above, or to minor variations of those rules, are possible.

In view of the above discussion and the process flow illustrated in FIG. 4, it will be appreciated that embodiments of the presently disclosed techniques include several methods suitable for implementation in a wireless device configured for operation in a wireless communication network and further configured for device-to-device communication with one or more other wireless devices. According to some of these embodiments, the method includes receiving a first incoming version indicator from a second wireless device, the first incoming version indicator identifying an access stratum version supported by the second wireless device, and transmitting a device version indicator in one or more outgoing messages, in response to determining that the first incoming version indicator is unknown to the first wireless device or that the first incoming version indicator corresponds to an access stratum version that is not supported by the first wireless device. The transmitted device version indicator corresponds to the most recent access stratum version of two or more access stratum versions supported by the first wireless device.

In some embodiments, the first incoming version indicator is received and the device version indicator is transmitted in Medium Access Control (MAC) layer messages. In others, the first incoming version indicator and the device version indicator are signaled using logical channel identifier (LCID) index values in MAC control elements. In still others, the first incoming version indicator and device version indicator are signaled using values carried by special MAC control elements, each of the special MAC control elements carrying a predetermined logical channel identifier (LCID) index value that identifies the special MAC control element as carrying an access stratum version indicator. In yet other embodiments, the first incoming version indicator and device version indicator are signaled using values carried in a predetermined field of MAC layer messages having a format specific to device-to-device communication, each of the MAC layer messages carrying a bit indicating that the MAC layer has the format specific to device-to-device communication.

In some instances of the methods described above, the device version indicator is transmitted in response to receiving an incoming version indicator that corresponds to a more recent access stratum version than the most recent access stratum version supported by the first wireless device. In other instances, the device version indicator is transmitted in response to receiving an incoming version indicator that corresponds to an earlier access stratum version than the earliest access stratum version supported by the first wireless device. In others, the device version indicator is transmitted in response to receiving an incoming version indicator that is unknown to the first wireless device.

In the above-summarized methods, the wireless device transmits a device version indicator in one or more outgoing messages in response to determining that the first incoming version indicator is unknown to the first wireless device or that the first incoming version indicator corresponds to an access stratum version that is not supported by the first wireless device. Of course, the wireless device may also receive incoming version indicators that correspond to an access stratum version that is supported by the wireless device. In some cases, that access stratum version may be less recent than the access stratum version currently used by the first wireless device. Accordingly, some embodiments and/or instances of the methods summarized above may further comprise receiving a second incoming version indicator, and subsequently using an access stratum version corresponding to the second incoming version indicator, in response to determining that the second incoming version indicator corresponds to an access stratum version that is supported by the first wireless device and that is less recent than an access stratum version currently used by the first wireless device. In some cases, subsequently using the access stratum version may comprise transmitting one or more messages that are formatted according to the access stratum version corresponding to the second incoming version indicator or that include an outgoing version indicator corresponding to the second incoming version indicator, or both.

Embodiments of the presently disclosed techniques include the several methods described above, including the methods illustrated in the process flow diagram of FIG. 4, as well as variants thereof. Other embodiments include mobile terminal apparatus configured to carry out one or more of these methods. In some embodiments of the invention, processing circuits, such as the processing circuit 110 in FIG. 1, are configured to carry out one or more of the techniques described in detail above. Likewise, other embodiments may include mobile terminals that include one or more such processing circuits. In some cases, these processing circuits are configured with appropriate program code, stored in one or more suitable memory devices, to implement one or more of the techniques described herein.

Of course, it will be appreciated that not all of the steps of these techniques are necessarily performed in a single microprocessor or even in a single module.

It will be further appreciated that program code and/or logic circuits arranged to carry out one or more of the techniques described herein may be designed and/or arranged in functional modules, or units, with each functional module or unit corresponding to one or more of the operations described herein. Each module may correspond to a module of program code, or a logic circuit, or a combination of both.

Figure 5:
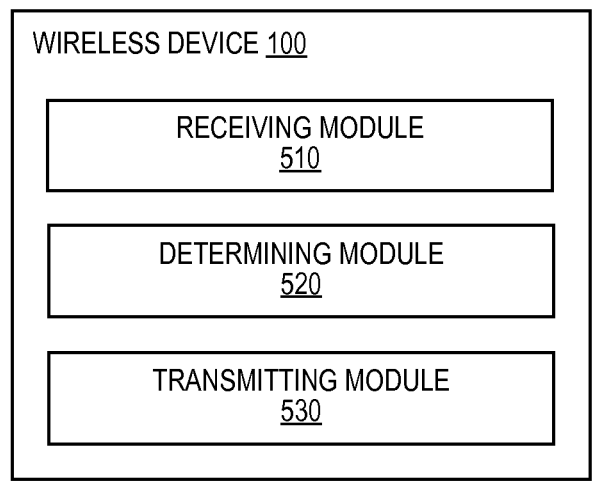
FIG. 5 is a block diagram illustrating another view of an example wireless device.

FIG. 5 thus illustrates an example functional module or circuit architecture as may be implemented in a wireless device such as the wireless device 100 shown in FIG. 1. The illustrated embodiment comprises a receiving module 510 for receiving a first incoming version indicator from a second wireless device, the first incoming version indicator identifying an access stratum version supported by the second wireless device, and a determining module 520 for determining whether the first incoming version indicator is known to the first wireless device or whether the first incoming version indicator corresponds to an access stratum version that is not supported by the first wireless device. The embodiment further includes a transmitting module 530 for transmitting a device version indicator in one or more outgoing messages, in response to determining that the first incoming version indicator is unknown to the first wireless device or that the first incoming version indicator corresponds to an access stratum version that is not supported by the first wireless device, the device version indicator corresponding to the most recent access stratum version of two or more access stratum versions supported by the first wireless device. Variations of the illustrated embodiment according to any of the techniques described herein are possible.

It will be appreciated by the person of skill in the art that various modifications may be made to the above described embodiments without departing from the scope of the present invention. For example, although embodiments of the present invention have been described with examples that reference a communication system compliant to the 3GPP-specified LTE standards, it should be noted that the solutions presented may be equally well applicable to other networks. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

In the present description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments have been described herein, with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) running on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

EXAMPLE EMBODIMENTS

Embodiments of the presently disclosed techniques and apparatus include, but are not limited to, the following:

(a). A method, in a first wireless device configured for operation in a wireless communication network and further configured for device-to-device communication with one or more other wireless devices, the method comprising:
  receiving a first incoming version indicator from a second wireless device, the first incoming version indicator identifying an access stratum version supported by the second wireless device; and
  transmitting a device version indicator in one or more outgoing messages, in response to determining that the first incoming version indicator is unknown to the first wireless device or that the first incoming version indicator corresponds to an access stratum version that is not supported by the first wireless device, the device version indicator corresponding to the most recent access stratum version of two or more access stratum versions supported by the first wireless device.

(b). The method of embodiment (a), wherein the first incoming version indicator is received and the device version indicator is transmitted in Medium Access Control (MAC) layer messages.

(c). The method of embodiment (b), wherein the first incoming version indicator and the device version indicator are signaled using logical channel identifier (LCID) index values in MAC control elements.

(d). The method of embodiment (b), wherein the first incoming version indicator and device version indicator are signaled using values carried by special MAC control elements, each of the special MAC control elements carrying a predetermined logical channel identifier (LCID) index value that identifies the special MAC control element as carrying an access stratum version indicator.

(e). The method of embodiment (b), wherein the first incoming version indicator and device version indicator are signaled using values carried in a predetermined field of MAC layer messages having a format specific to device-to-device communication, each of the MAC layer messages carrying a bit that indicates that the MAC layer has the format specific to device-to-device communication.

(f). The method of any of embodiments (a)-(e), wherein the device version indicator is transmitted in response to receiving an incoming version indicator that corresponds to a more recent access stratum version than the most recent access stratum version supported by the first wireless device.

(g). The method of any of embodiments (a)-(e), wherein the device version indicator is transmitted in response to receiving an incoming version indicator that corresponds to an earlier access stratum version than the earliest access stratum version supported by the first wireless device.

(h). The method of any of embodiments (a)-(e, wherein the device version indicator is transmitted in response to receiving an incoming version indicator that is unknown to the first wireless device.

(i). The method of any of embodiments (a)-(h), further comprising:
  receiving a second incoming version indicator; and
  subsequently using an access stratum version corresponding to the second incoming version indicator, in response to determining that the second incoming version indicator corresponds to an access stratum version that is supported by the first wireless device and that is less recent than an access stratum version currently used by the first wireless device.

(j). The method of embodiment (i), wherein subsequently using the access stratum version corresponding to the second incoming version indicator comprises transmitting one or more messages that are formatted according to the access stratum version corresponding to the second incoming version indicator or that include an outgoing version indicator corresponding to the second incoming version indicator, or both.

(k). A wireless device, comprising a radio circuit configured for communication with a wide-area wireless network and for device-to-device communication with one or more other wireless devices and further comprising a processing circuit configured to control the radio circuit, wherein the processing circuit is further configured to:
  receive a first incoming version indicator from a second wireless device, via the radio circuit, the first incoming version indicator identifying an access stratum version supported by the second wireless device; and
  transmit a device version indicator in one or more outgoing messages, via the radio circuit, in response to determining that the first incoming version indicator is unknown to the first wireless device or that the first incoming version indicator corresponds to an access stratum version that is not supported by the first wireless device, the device version indicator corresponding to the most recent access stratum version of two or more access stratum versions supported by the first wireless device.

(l). The wireless device of embodiment (k), wherein the processing circuit is configured to receive said first incoming version indicator and to transmit the device version indicator in Medium Access Control (MAC) layer messages.

(m). The wireless device of embodiment (l), wherein the processing circuit is configured to receive said first incoming version indicator and to transmit the device version indicator using logical channel identifier (LCID) index values in MAC control elements.

(n). The wireless device of embodiment (l), wherein the processing circuit is configured to receive said first incoming version indicator and to transmit the device version indicator using values carried by special MAC control elements, each of the special MAC control elements carrying a predetermined logical channel identifier (LCID) index value that identifies the special MAC control element as carrying an access stratum version indicator.

(o). The wireless device of embodiment (l), wherein the processing circuit is configured to receive said first incoming version indicator and to transmit the device version indicator using values carried in a predetermined field of MAC layer messages having a format specific to device-to-device communication, each of the MAC layer messages carrying a bit that indicates that the MAC layer has the format specific to device-to-device communication.

(p). The wireless device of any of embodiments (k)-(o), wherein the processing circuit is configured to transmit the device version indicator in response to receiving an incoming version indicator that corresponds to a more recent access stratum version than the most recent access stratum version supported by the first wireless device.

(q). The wireless device of any of embodiments (k)-(o), wherein the processing circuit is configured to transmit the device version indicator in response to receiving an incoming version indicator that corresponds to an earlier access stratum version than the earliest access stratum version supported by the first wireless device.

(r). The wireless device of any of embodiments (k)-(o), wherein the processing circuit is configured to transmit the device version indicator in response to receiving an incoming version indicator that is unknown to the first wireless device.

(s). The wireless device of any of embodiments (k)-(r), wherein the processing circuit is further configured to:
receive a second incoming version indicator, via the radio circuit; and
subsequently use an access stratum version corresponding to the second incoming version indicator, in response to determining that the second incoming version indicator corresponds to an access stratum version that is supported by the first wireless device and that is less recent than an access stratum version currently used by the first wireless device.

(t). The wireless device of embodiment (s), wherein the processing circuit is configured to subsequently use the access stratum version corresponding to the second incoming version indicator by transmitting one or more messages that are formatted according to the access stratum version corresponding to the second incoming version indicator or that include an outgoing version indicator corresponding to the second incoming version indicator, or both.

(u). A wireless device configured for communication with a wide-area wireless network and for device-to-device communication with at least one other wireless device, wherein the wireless device is further configured to:
receive a first incoming version indicator from a second wireless device, the first incoming version indicator identifying an access stratum version supported by the second wireless device; and
transmit a device version indicator in one or more outgoing messages, in response to determining that the first incoming version indicator is unknown to the first wireless device or that the first incoming version indicator corresponds to an access stratum version that is not supported by the first wireless device, the device version indicator corresponding to the most recent access stratum version of two or more access stratum versions supported by the first wireless device.

(v). The wireless device of embodiment (u), wherein the wireless device is configured to receive said first incoming version indicator and to transmit the device version indicator in Medium Access Control, MAC, layer messages.

(w). The wireless device of embodiment (v), wherein the wireless device is configured to receive said first incoming version indicator and to transmit the device version indicator using values carried in a predetermined field of MAC layer messages having a format specific to device-to-device communication, each of the MAC layer messages carrying a bit indicating that the MAC layer has the format specific to device-to-device communication.

(x). The wireless device of any of embodiments (u)-(w), wherein the wireless device is configured to transmit the device version indicator in response to receiving an incoming version indicator that corresponds to a more recent access stratum version than the most recent access stratum version supported by the first wireless device.

(y). The wireless device of any of embodiments (u)-(w), wherein the wireless device is configured to transmit the device version indicator in response to receiving an incoming version indicator that corresponds to an earlier access stratum version than the earliest access stratum version supported by the first wireless device.

(z). The wireless device of any of embodiments (u)-(w), wherein the wireless device is configured to transmit the device version indicator in response to receiving an incoming version indicator that is unknown to the first wireless device.

(aa). The wireless device of any of embodiments (u)-(z), wherein the wireless device is further configured to:
receive a second incoming version indicator; and
subsequently use an access stratum version corresponding to the second incoming version indicator, in response to determining that the second incoming version indicator corresponds to an access stratum version that is supported by the first wireless device and that is less recent than an access stratum version currently used by the first wireless device.

(bb). The wireless device of embodiment (aa), wherein the wireless device is configured to subsequently use the access stratum version corresponding to the second incoming version indicator by transmitting one or more messages that are formatted according to the access stratum version corresponding to the second incoming version indicator or that include an outgoing version indicator corresponding to the second incoming version indicator, or both.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure, and shall not be restricted or limited by the foregoing detailed description.

What is claimed is:

1. A method, in a first wireless device configured for operation in a wireless communication network and further configured for device-to-device communication with at least one other wireless device, the method comprising:
receiving a first incoming version indicator directly from a second wireless device, the first incoming version indicator identifying an access stratum version supported by the second wireless device; and
transmitting a device version indicator in one or more outgoing messages, in response to determining that the first incoming version indicator is unknown to the first wireless device or that the first incoming version indicator corresponds to an access stratum version that is not supported by the first wireless device, the device version indicator corresponding to the most recent access stratum version of two or more access stratum versions supported by the first wireless device.

2. The method of claim 1, wherein the first incoming version indicator is received and the device version indicator is transmitted in Medium Access Control (MAC) layer messages.

3. The method of claim 2, wherein the first incoming version indicator and device version indicator are signaled using values carried in a predetermined field of MAC layer messages having a format specific to device-to-device communication, each of the MAC layer messages carrying a bit indicating that the MAC layer has the format specific to device-to-device communication.

4. The method of claim 1, wherein the device version indicator is transmitted in response to receiving the first incoming version indicator that corresponds to a more recent access stratum version than the most recent access stratum version supported by the first wireless device.

5. The method of claim 1, wherein the device version indicator is transmitted in response to receiving the first incoming version indicator that corresponds to an earlier access stratum version than the earliest access stratum version supported by the first wireless device.

6. The method of claim 1, wherein the device version indicator is transmitted in response to receiving the first incoming version indicator that is unknown to the first wireless device.

7. The method of claim 1, further comprising:
receiving a second incoming version indicator; and
subsequently using an access stratum version corresponding to the second incoming version indicator, in response to determining that the second incoming version indicator corresponds to an access stratum version that is supported by the first wireless device and that is less recent than an access stratum version currently used by the first wireless device.

8. The method of claim 7, wherein subsequently using the access stratum version corresponding to the second incoming version indicator comprises transmitting one or more messages that are formatted according to the access stratum version corresponding to the second incoming version indicator or that include an outgoing version indicator corresponding to the second incoming version indicator, or both.

9. A first wireless device, comprising a radio circuit configured for communication with a wide-area wireless network and for device-to-device communication with at least one other wireless device and further comprising a processing circuit configured to control the radio circuit, wherein the processing circuit is further configured to:
receive a first incoming version indicator directly from a second wireless device, via the radio circuit, the first incoming version indicator identifying an access stratum version supported by the second wireless device; and
transmit a device version indicator in one or more outgoing messages, via the radio circuit, in response to determining that the first incoming version indicator is unknown to the first wireless device or that the first incoming version indicator corresponds to an access stratum version that is not supported by the first wireless device, the device version indicator corresponding to the most recent access stratum version of two or more access stratum versions supported by the first wireless device.

10. The first wireless device of claim 9, wherein the processing circuit is configured to receive said first incoming version indicator and to transmit the device version indicator in Medium Access Control (MAC) layer messages.

11. The first wireless device of claim 10, wherein the processing circuit is configured to receive said first incoming version indicator and to transmit the device version indicator using values carried in a predetermined field of MAC layer messages having a format specific to device-to-device communication, each of the MAC layer messages carrying a bit indicating that the MAC layer has the format specific to device-to-device communication.

12. The first wireless device of claim 9, wherein the processing circuit is configured to transmit the device version indicator in response to receiving a first incoming version indicator that corresponds to a more recent access stratum version than the most recent access stratum version supported by the first wireless device.

13. The first wireless device of claim 9, wherein the processing circuit is configured to transmit the device version indicator in response to receiving the first incoming version indicator that corresponds to an earlier access stratum version than the earliest access stratum version supported by the first wireless device.

14. The first wireless device of claim 9, wherein the processing circuit is configured to transmit the device version indicator in response to receiving the first incoming version indicator that is unknown to the first wireless device.

15. The first wireless device of claim 9, wherein the processing circuit is further configured to:
receive a second incoming version indicator, via the radio circuit; and
subsequently use an access stratum version corresponding to the second incoming version indicator, in response to determining that the second incoming version indicator corresponds to an access stratum version that is supported by the first wireless device and that is less recent than an access stratum version currently used by the first wireless device.

16. The first wireless device of claim 15, wherein the processing circuit is configured to subsequently use the access stratum version corresponding to the second incoming version indicator by transmitting one or more messages that are formatted according to the access stratum version corresponding to the second incoming version indicator or that include an outgoing version indicator corresponding to the second incoming version indicator, or both.

17. A non-transitory computer-readable medium comprising, stored thereupon, a computer program product comprising program instructions configured for execution by a processor in a first wireless device configured for operation in a wireless communication and further configured for device-to-device communication with at least one other wireless device, wherein the program instructions are configured so as to cause the first wireless device to:
- receive a first incoming version indicator directly from a second wireless device, the first incoming version indicator identifying an access stratum version supported by the second wireless device; and
- transmit a device version indicator in one or more outgoing messages, in response to determining that the first incoming version indicator is unknown to the first wireless device or that the first incoming version indicator corresponds to an access stratum version that is not supported by the first wireless device, the device version indicator corresponding to the most recent access stratum version of two or more access stratum versions supported by the first wireless device.

\* \* \* \* \*